United States Patent [19]

Huvey

[11] Patent Number: 5,061,338
[45] Date of Patent: Oct. 29, 1991

[54] DEVICE FOR MANUFACTURING CURVED STRIPS INCLUDING A BARREL CAM FOR DISCONTINUOUS DISPLACEMENT OF THE CURVED STRIPS

[75] Inventor: Michel Huvey, Bougival, France

[73] Assignee: Institut Francais du Petrole, Rueil-Malmaison, France

[21] Appl. No.: 474,338

[22] Filed: Feb. 2, 1990

[30] Foreign Application Priority Data

Feb. 2, 1989 [FR] France ................... 89 01331

[51] Int. Cl.⁵ ............... B65H 81/00; B31C 13/00
[52] U.S. Cl. ................. 156/425; 156/433; 156/195; 425/320; 425/391; 425/505
[58] Field of Search ........ 156/180, 166, 425, 428–430, 156/433, 441, 195; 264/281, 136, 137, 257; 425/DIG. 7, 505, 90, 391, 320, 502; 267/148, 149, 166

[56] References Cited

U.S. PATENT DOCUMENTS

| | | |
|---|---|---|
| 3,378,426 | 4/1968 | Medney . |
| 3,728,189 | 4/1973 | Hannes et al. ............ 264/281 X |
| 3,966,388 | 6/1976 | Bonavent et al. ............ 425/505 |
| 4,180,429 | 12/1979 | Alber ............ 156/428 X |
| 4,434,121 | 2/1984 | Schäper ............ 264/281 X |

FOREIGN PATENT DOCUMENTS

| | | |
|---|---|---|
| 2312356 | 12/1976 | France . |
| 2401760 | 4/1979 | France ............ 267/148 |
| 2494401 | 5/1982 | France . |
| 2616376 | 12/1988 | France . |
| 59-144837 | 8/1984 | Japan ............ 267/166 |
| 2088320 | 6/1982 | United Kingdom . |

Primary Examiner—Michael W. Ball
Assistant Examiner—Jeff H. Aftergut
Attorney, Agent, or Firm—Antonelli, Terry Stout & Kraus

[57] ABSTRACT

A processing device for a continuous manufacturing of curved strips with a constant or non-constant cross-section, with the curved strips including reinforcing elements embedded in a stabilizable material and produced inside a molding element wrapped around a mandrel at a first end. The reinforcing elements are disposed in the molding element and the elements are impregnated with a stabilizable material, which material is stabilized over at least a portion of a length of the mandrel. The molding element is axially discontinuously displaced relative to the mandrel so as to run toward a second end of the mandrel opposite the first end, with the molding element being disengaged from the mandrel at the second end thereof.

7 Claims, 1 Drawing Sheet

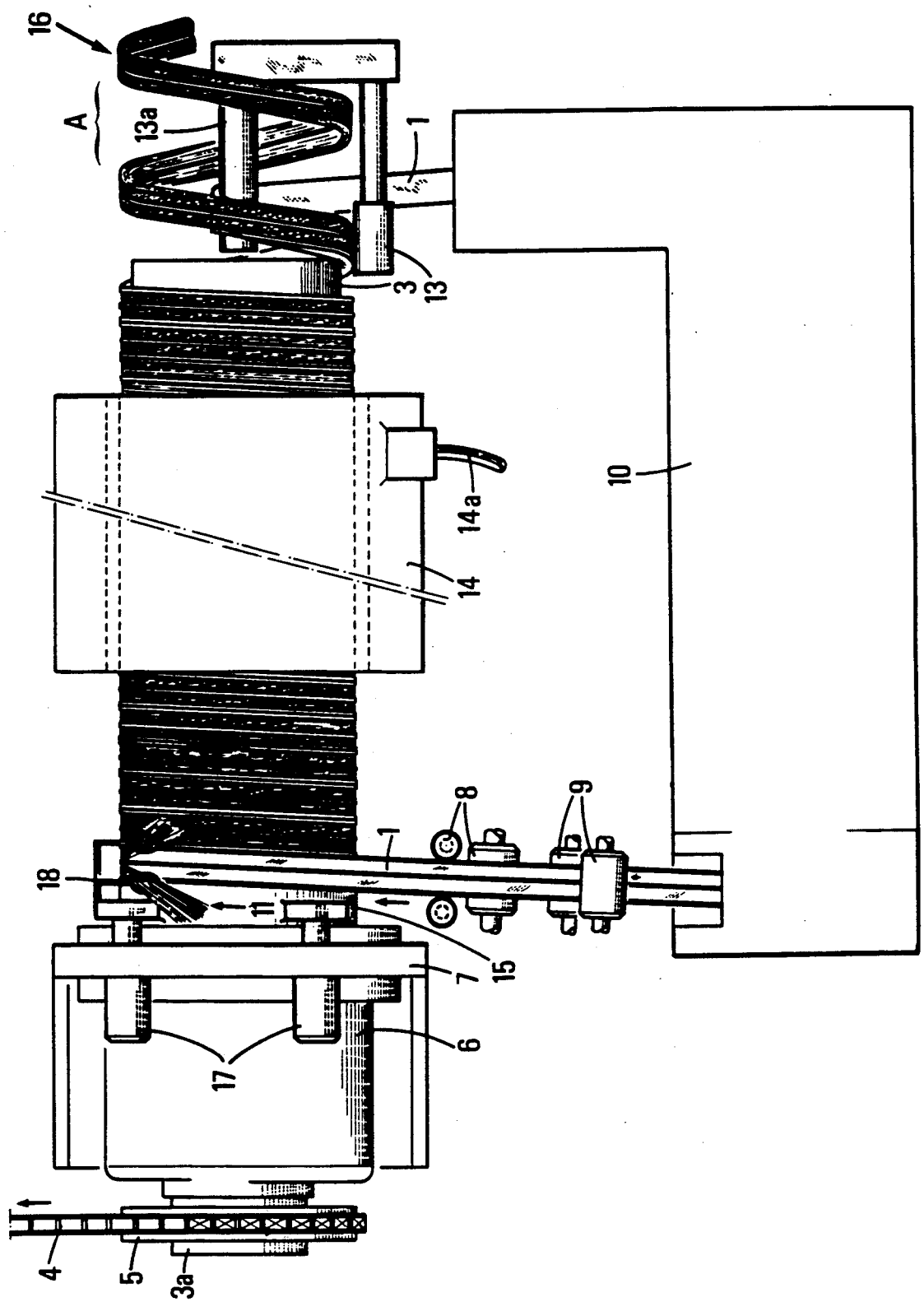

DEVICE FOR MANUFACTURING CURVED STRIPS INCLUDING A BARREL CAM FOR DISCONTINUOUS DISPLACEMENT OF THE CURVED STRIPS

FIELD OF THE INVENTION

The present invention relates to a process and device for continuously manufacturing curved strips with a constant or non-constant cross section, comprising reinforcing elements embedded in a stabilizable material.

BACKGROUND OF THE INVENTION

Curved strips of this kind are usable, especially but not exclusively, for manufacturing high-strength lightweight tubing by helically wrapping shaped curved strips. It has already been proposed, for example, in French Patent 2,312,356 to make a strip of reinforced plastic by packing with a mixture of high-strength filaments and crosslinkable plastic, a molding element in the form of a groove wrapped around a mandrel, with the strip being extracted from this molding element following at least partial crosslinking, and with the crosslinking possibly resulting from heat treatment.

However, during the manufacture of such shaped curved strips, the length of the strips produced by machine is rapidly limited by the fact that the number of turns of the molding element on the mandrel is limited, and by the crosslinking time to which the strips are subjected while in the molding element. Thus, the number of turns of the molding element, most of which is located inside the crosslinking means, is limited mainly by the problems involved in advancing the molding element on the mandrel, with the difficulties increasing with the number of turns.

SUMMARY OF THE INVENTION

The goal of the present invention, therefore, is to provide a process and a device which make it possible to place on the mandrel a larger number of turns of the molding element without changing the quality of the strips, thus making it possible to manufacture curved strips at a faster rate.

The present invention proposes a new process for continuous manufacture of curved strips with constant or non-constant cross section, comprising reinforcing elements embedded in a stabilizable material produced inside a molding element, which is wrapped around a mandrel at a first end, and in which reinforcing elements impregnated with stabilizable material are disposed, after which said material is stabilized over at least a portion of the length of the mandrel. The molding element is displaced axially and discontinuously relative to the mandrel, with the displacement being in a direction which produces a movement of the molding element toward a second end of the mandrel opposite with the first end, and the molding element is disengaged from the mandrel at with the second end.

When the molding element is wrapped around the mandrel along the side of a barrel cam, axial displacement can be produced by alternating translational movement with an axial component of the barrel cam relative to the mandrel.

With the mandrel fixed in translation, axial displacements of the molding element can be performed by said barrel cam.

The displacements can be produced at an essentially regular rate relative to the frequency of rotation of the mandrel. These displacements can have, as a unit, an amplitude which is essentially equal to the quotient of a transverse dimension of the molding element, measured along the axis of the mandrel, divided by the rate of with the displacements.

The unit amplitude of the displacements can be comprised of between twice the dimension of the molding element and a tenth of the dimension of the molding element.

The axial displacements of the molding element can be produced by causing the mandrel to move axially.

The invention also provides a device for continuously manufacturing curved shaped strips from reinforcing elements impregnated with a stabilizable material, comprising means for causing a mandrel to rotate around its longitudinal axis, a molding element wrappable around the mandrel and having an interior profile receiving the reinforcing elements impregnated with stabilizable material, means for guiding the wrapping of the molding element, means for introducing into the molding element, reinforcing elements impregnated with stabilizable material, means for stabilizing with the stabilizable material, disposed along at least one part of the mandrel, making it possible to produce with the strips, and means for extracting with the molding element and with the curved strips at one end of the mandrel.

The device additionally comprises means for continuous displacement of with the molding element relative to with the mandrel, along the axis of the mandrel and toward with the end, where the molding element and the curved strips are removed.

The guide elements may comprise a barrel cam having a side along which with the molding element is wrapped, said barrel cam being displaceable along the axis of the mandrel and the means of discontinuous displacement being capable of producing a reciprocating movement of the barrel cam relative to the mandrel.

The mandrel is advantageously fixed and the barrel cam is movable along the axis of the mandrel.

The mandrel can be axially mobile and the barrel cam can be fixed.

The means of displacement are capable of producing displacements at a rate between ½ and 10 relative to the frequency of rotation of the mandrel, and the amplitude of the displacements can be essentially equal to the transverse dimension of the molding element along the axis of the mandrel, divided by the rate of the displacements.

The term "stabilization" will be understood to mean a physical or chemical process such as melting with cooling or crosslinking which enables a body, in order for it to qualify as stabilizable, to assume a stable form. Thermoplastic, thermosettable, or elastomeric materials are stabilizable bodies.

BRIEF DESCRIPTION OF THE DRAWING

The invention will be better understood and its advantages will become apparent from reading the following description taken in connection with the accompanying drawing wherein:

The single FIGURE is a schematic view of a device for continuously manufacturing curved strips with a constant or non-constant cross-section constructed in accordance with the present invention.

DETAILED DESCRIPTION

Referring now to the single FIGURE of the drawing, according to this figure, a mold provided with a hollow cavity or a shaped molding element 1 is wrapped on a mandrel 3 at a first end of the mandrel 3.

Shaft 3a of mandrel 3 is connected to means for rotating the mandrel 3, which comprise, for example, a chain 4 engaging toothed pinion 5 keyed to shaft 3a.

Shaft 3a rests in bearing 6 with rollers, with the bearing being integral with a frame 7.

Before being wrapped on mandrel 3 along the side of a barrel cam 15, at a first end of the mandrel, the shaped mold or molding element 1 passes between guidewheels 8 and 9.

Barrel cam 15 comprises one helical side relative to the longitudinal axis of the mandrel, said side permitting the turns of mold 1 to be positioned correctly.

The shaped mold or molding element 1 has two parallel longitudinal grooves, which, as the shaped mold or molding element 1 is wrapped on mandrel 3, are filled with high-strength filaments or rovings 11, previously impregnated with a stabilizable plastic capable of sticking to the filaments with the mixture of the filaments and stabilizable material forming the cores 16 of the section which will become, after stabilization and extraction from the mandrel, the reinforced curved strips.

The filaments are properly guided toward molding element 1 by which is an element 18 which is integral with barrel cam 15, so that their respective movements are synchronized.

Shaped mold 1, thus filled, then enters a furnace 14, where it is subjected to heat treatment capable of stabilizing the reinforced plastic it contains.

The furnace is supplied with power by any appropriate means, such as cable 14a, for example, if electrical heating means are employed.

At a second end of the mandrel 3, the curved strips 16, formed by molding, are extracted from shaped mold 1. This extraction is accomplished, for example, by curving the shaped mold 1 around wheels 13 and 13a and causing the shaped mold 1 to pass between groups of molded strips, for example, in space A.

Reinforced curved strips 16 removed from shaped mold 1 are sent to a location for storage or use, and the shaped mold 1 is continuously re-used after passing through a device 10 for cleaning the shaped mold 1 by a suitable means.

Barrel cam 15 is caused to move in translation in an alternating motion by several jacks 17 mounted on frame 7 and acting simultaneously on barrel cam 15 to push the shaped molding element 1 toward the second end of the mandrel. Jacks 17 employed are hydraulic jacks but it would also be possible easily to use other kinds of jacks, such electric jacks. The amplitude of the displacements of barrel cam 15 (or of jacks 17) depends on the rate of displacement of the jacks. Generally speaking, independently of the rate of displacement of the jacks 17, the axial displacement of molding element 1 is preferably uniquely caused by the movements of barrel cam 15. Thus, the jacks 17 operate independently of the rotation of the mandrel 3.

Thus, preferably, the sum of the axial displacements of the shaped molding element 1 is equal to the number of turns of the molding element wrapped on the mandrel 3, multiplied by the transverse dimension of the shaped molding element 1 along the longitudinal axis of the mandrel 1.

In other words, the amplitude of the displacements of the barrel cam 15 is preferably equal to the transverse dimension of the shaped molding element 1 along the axis of the longitudinal mandrel 3, divided by the rate of displacement relative to the frequency of rotation of the mandrel 3.

Especially in accordance with the characteristics of the mandrel, the molding element, and the curved strips, the rate of displacement of the barrel cam 15 is changed. This rate of displacement is advantageously 0.5 to 10 displacements per turn of the mandrel 3.

As a nonlimitative example, the molding element may be made of polyamide 11 (generally designated by the trademark Rilsan) by a conventional extrusion process and have two internal rectangular sections measuring 5 mm$\times$7 mm, and external walls and internal partitions 1 mm thick. This mold groove is lined with 70 parts by weight of unidirectional, nontwisted, and continuous fiberglass rovings, and 30 parts by weight of a mixture of epoxy resin of the bisphenol A diglycidylether type (100 parts) and 4,4'- diaminodiphenylmethane (27 parts by weight).

After passing through the furnace 14, the finished product leaves mandrel 3 and the coil thus produced can be used to make a strong, lightweight tube.

I claim:

1. Device for continuously manufacturing curved shaped strips from reinforcing elements impregnated with a stabilizable material, the device comprising means for rotating a mandrel around a longitudinal axis, a molding element wrappable around the mandrel and having an interior profile for receiving reinforcing elements impregnated with the stabilizable material, guide means for guiding a wrapping of the molding element on the mandrel, means for introducing reinforcing elements impregnated with stabilizable material into the molding element, means disposed on at least a portion of a length of the mandrel for stabilizing said stabilizable material so as to enable an obtaining of said curved shaped strips, means for extracting said molding element and said curved strips at one end of said mandrel and means for a discontinuous displacement of said molding element relative to said mandrel along the longitudinal axis of the mandrel and toward an end of the mandrel at which the molding element and the curved strips are removed including means fixed to a frame member for communicating independent of mandrel rotation a displacing motion to said means for discontinuous displacement of said molding element.

2. Device for continuously manufacturing curved shaped strips from reinforcing elements impregnated with a stabilizable material, the device comprising:
   means for rotating a mandrel around a longitudinal axis,
   a molding element wrappable around the mandrel and having an interior profile for receiving reinforcing elements impregnated with the stabilizable material, guide means for guiding a wrapping of the molding element on the mandrel including a barrel cam having a side along which said molding element is wrapped, said barrel cam being displaceable along a longitudinal axis of the mandrel,
   means for introducing reinforcing elements impregnated with stabilizable material into the molding element,
   means disposed on at least a portion of a length of the mandrel for stabilizing said stabilizable material so as to enable an obtaining of said curved shaped strips, means for extracting said molding element and said curved strips at one end of said mandrel, and means for a discontinuous displacement of said molding element along the longitudinal axis of the mandrel and toward an end of the mandrel at which the molding element and the curved strips are removed, wherein said discontinuous displacement means is adapted to produce a reciprocating movement of the barrel cam relative to the mandrel.

3. Device according to claim 2, wherein said mandrel is axially fixed and said barrel cam is movable along the longitudinal axis of the mandrel.

4. Device according to one of claims 1, 2 or 3, wherein said discontinuous displacement means produces displacements at a rate of between ½ and 10 relative to a frequency of rotation of the mandrel, and wherein an amplitude of the displacements is substantially equal to a transverse dimension of the molding element along the longitudinal axis of the mandrel divided by the rate of said displacements.

5. Device according to one of claims 1 or 2, wherein said mandrel is axially movable along the longitudinal axis of the mandrel.

6. Device according to one of claims 2 or 3, wherein a guide element movable in synchronization with said barrel cam is provided for guiding a movement of filaments of the reinforcing elements toward the molding element.

7. Device for continuously manufacturing curved shaped strips from reinforcing elements impregnated with a stabilizable material, the device comprising means for rotating a mandrel around a longitudinal axis, a molding element wrappable around the mandrel and having an interior profile for receiving reinforcing elements impregnated with the stabilizable material, guide means for guiding a wrapping of the molding element on the mandrel including a barrel cam having a side along which said molding element is wrapped, means for introducing reinforcing elements impregnated with stabilizable material into the molding element disposed on at least a portion of a length of the mandrel for stabilizing said stabilizable material so as to enable an obtaining of said curved shaped strips, means for extracting said molding element and said curved strips at one end of said mandrel and means for discontinuous displacement of said molding element relative to said mandrel along the longitudinal axis of the mandrel and toward an end of the mandrel at which the molding element and the curved strips are removed, and a guide element movable in synchronization with said barrel cam for guiding a movement of filaments of the reinforcing elements toward the molding element.

* * * * *